(12) United States Patent
Zhou et al.

(10) Patent No.: US 9,154,314 B2
(45) Date of Patent: *Oct. 6, 2015

(54) METHOD AND SYSTEM FOR IMPLEMENTING USAGE MONITORING CONTROL

(75) Inventors: Xiaoyun Zhou, Shenzhen (CN); Tong Rui, Shenzhen (CN); Jinhua Wu, Shenzhen (CN); Min Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 723 days.

This patent is subject to a terminal disclaimer.

(21) Appl. No.: 13/510,304

(22) PCT Filed: Nov. 12, 2010

(86) PCT No.: PCT/CN2010/078662
§ 371 (c)(1),
(2), (4) Date: May 17, 2012

(87) PCT Pub. No.: WO2011/060698
PCT Pub. Date: May 26, 2011

(65) Prior Publication Data
US 2012/0233324 A1    Sep. 13, 2012

(30) Foreign Application Priority Data
Nov. 23, 2009    (CN) .......................... 2009 1 0238241

(51) Int. Cl.
*G06F 15/173*    (2006.01)
*H04L 12/14*    (2006.01)
(Continued)

(52) U.S. Cl.
CPC ............ *H04L 12/14* (2013.01); *H04L 12/1403* (2013.01); *H04L 12/1407* (2013.01);
(Continued)

(58) Field of Classification Search
CPC ..... H04L 12/1407; H04L 47/10; H04L 47/11; H04L 47/12; H04L 47/20; H04L 65/80

USPC .......................................................... 709/224
See application file for complete search history.

(56) References Cited

U.S. PATENT DOCUMENTS 7,907,524 B2    3/2011    Willars et al.
8,797,859 B2 *  8/2014    Stenfelt et al. ................ 370/230
(Continued)

FOREIGN PATENT DOCUMENTS

CN    101325780 A    12/2008
CN    101409954 A    4/2009
(Continued)

OTHER PUBLICATIONS

WO 2011/057651 A1, Included to show priority date for U.S. Pat. No. 8,797,859 B2; 1 page, 2011.*
(Continued)

*Primary Examiner* — Richard G Keehn
(74) *Attorney, Agent, or Firm* — Oppedahl Patent Law Firm LLC

(57) ABSTRACT

The present disclosure provides a method for implementing usage monitoring control, comprising: a PCRF makes a usage monitoring policy for each IP-CAN session or service data flow that shares a total allowanced usage according to the obtained total allowanced usage shared by multiple users, and the PCRF sends the usage monitoring policy to a PCEF (200); the PCEF performs a usage monitoring according to the usage monitoring policy sent by the PCRF, and reports a usage to the PCRF (201); the PCRF deducts a consumed usage from the total allowanced usage shared by the multiple users after the PCRF receives the usage reported by the PCEF (202). The present disclosure also provides a system for implementing usage monitoring control. Through the solution of the present disclosure, when multiple users share a total allowanced usage, PCRF simultaneously monitors the usage on the multiple users according to the total allowanced usage, thereby avoiding conflicts in policy and charging controls.

18 Claims, 5 Drawing Sheets

(51) Int. Cl.
*H04L 12/801* (2013.01)
*H04L 29/06* (2006.01)
*H04L 12/813* (2013.01)
*H04W 4/26* (2009.01)
*H04M 15/00* (2006.01)
*H04W 4/24* (2009.01)

(52) U.S. Cl.
CPC ............ *H04L12/1432* (2013.01); *H04L 47/10* (2013.01); *H04L 47/11* (2013.01); *H04L 47/12* (2013.01); *H04L 47/20* (2013.01); *H04L 65/80* (2013.01); *H04M 15/765* (2013.01); *H04M 15/7652* (2013.01); *H04M 15/88* (2013.01); *H04W 4/24* (2013.01); *H04W 4/26* (2013.01)

(56) References Cited

U.S. PATENT DOCUMENTS

| | | | |
|---|---|---|---|
| 2006/0140381 | A1 | 6/2006 | Croak et al. |
| 2007/0066286 | A1 | 3/2007 | Hurtta |
| 2007/0133428 | A1 | 6/2007 | Taylor et al. |
| 2008/0229385 | A1 | 9/2008 | Feder et al. |
| 2010/0043053 | A1 | 2/2010 | Wei et al. |
| 2010/0150003 | A1 | 6/2010 | Andreasen et al. |
| 2010/0217855 | A1 | 8/2010 | Przybysz |
| 2011/0208853 | A1 | 8/2011 | Castro-Castro et al. |
| 2012/0023246 | A1* | 1/2012 | Castro Castro et al. ...... 709/229 |
| 2012/0084425 | A1 | 4/2012 | Riley et al. |
| 2012/0117235 | A1 | 5/2012 | Castro Castro et al. |
| 2012/0210003 | A1 | 8/2012 | Castro et al. |
| 2012/0221955 | A1 | 8/2012 | Raleigh et al. |
| 2012/0233325 | A1 | 9/2012 | Zhou et al. |
| 2012/0297076 | A1* | 11/2012 | Wu et al. ...................... 709/227 |
| 2012/0324091 | A9 | 12/2012 | Raleigh et al. |
| 2013/0023230 | A9 | 1/2013 | Momtahan et al. |
| 2013/0072146 | A1 | 3/2013 | Smith |

FOREIGN PATENT DOCUMENTS

| | | | |
|---|---|---|---|
| CN | 101431420 | A | 5/2009 |
| CN | 101572951 | A | 11/2009 |
| CN | 101583115 | A | 11/2009 |
| CN | 102075900 | A | 5/2011 |
| EP | 2104270 | A1 | 9/2009 |
| WO | 2008/131695 | A1 | 11/2008 |
| WO | 2009049684 | A1 | 4/2009 |
| WO | 2009/082278 | A1 | 7/2009 |
| WO | 2011020498 | A1 | 2/2011 |

OTHER PUBLICATIONS

International Search Report in international application No. PCT/CN2010/078662, mailed on Feb. 24, 2011.

English Translation of the Written Opinion of the International Search Authority in international application No. PCT/CN2010/078662, mailed on Feb. 24, 2011.

ZTE, Policy control based on groups of subscriber, 3GPP TSG SA WG2 Meeting #76, TD S2-097085, Nov. 20, 2009. (1 page—see entire document).

Supplementary European Search Report in European application No. 10831113.5, mailed on Dec. 23, 2014.

3rd Generation Partnership Project; Technical Specification Group Services and System Aspects; Policy and charging control architecture (Release 9), 3GPP TS 23.203 V9.2.0, Sep. 2009.

English Translation of the Written Opinion of the International Search Authority in international application No. PCT/CN2010/078718, mailed on Feb. 24, 2011.

3GPP TSG SA WG2 Meeting #78, Policy control based on groups of subscriber, TD S2-101032, ZTE, San Francisco, Feb. 15, 2010.

Supplementary European Search Report in European application No. 10832629.9, mailed on Jul. 18, 2014.

International Search Report in international application No. PCT/CN2010/078718, mailed on Feb. 24, 2011.

\* cited by examiner

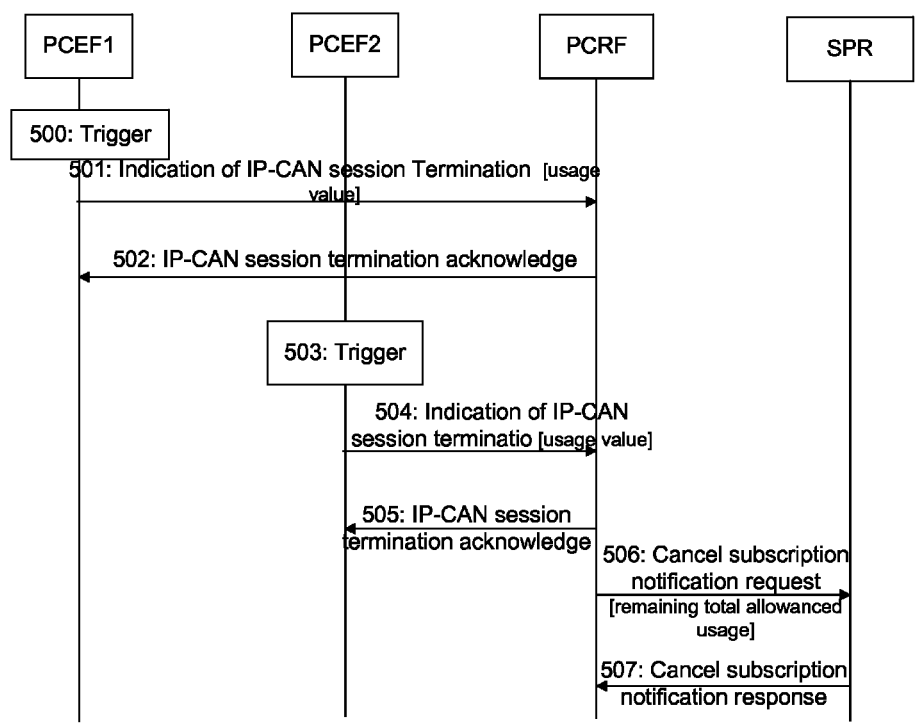

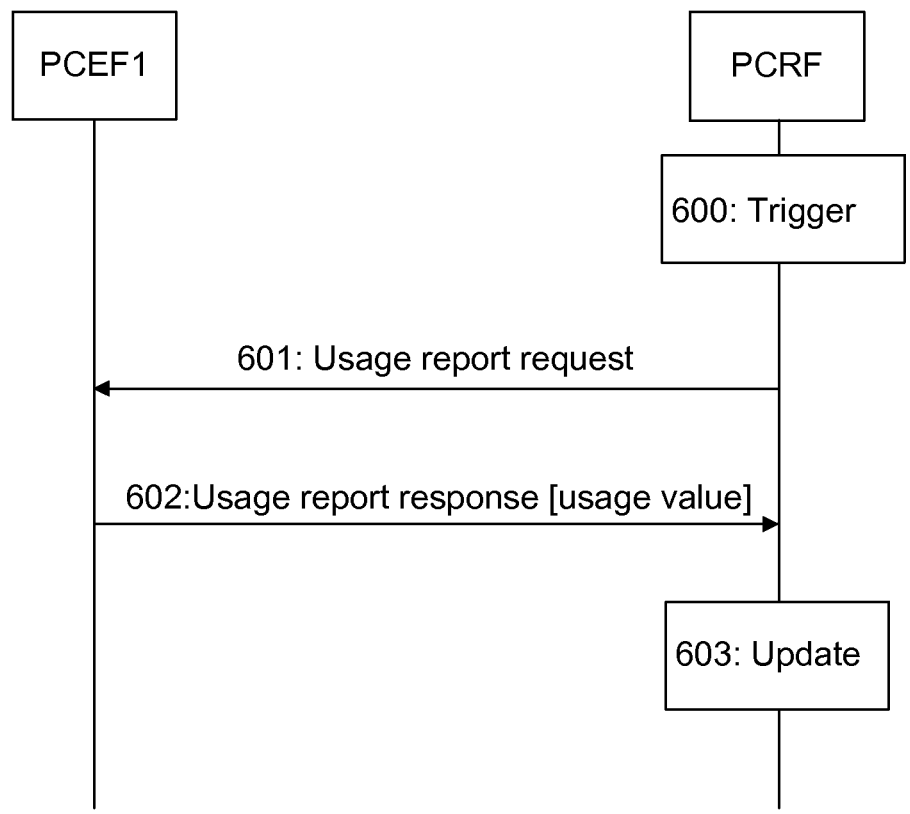

METHOD AND SYSTEM FOR IMPLEMENTING USAGE MONITORING CONTROL

TECHNICAL FIELD

The present disclosure relates to policy and charging technology, and more particularly to a method and system for implementing usage monitoring control.

BACKGROUND

Since the release of the 3rd Generation Partnership Project Release 7 (3GPP Release 7), policy and charging function is achieved by Policy and Charging Control (PCC) frame. PCC architecture is a functional frame that can be applied to multiple access technologies, for example, PCC architecture can be applied to Terrestrial Radio Access Network (UTRAN) of Universal Mobile Telecommunications System (UMTS), Global system for Mobile Communication (GSM)/Enhanced Data Rate for GSM Evolution (EDGE) radio access network, Interworking-Wireless Local Area Network (I-WLAN) and Evolved Packet System (EPS).

PCC mainly achieves two functions of policy control and charging. FIG. 1 is a schematic diagram of the architecture of existing PCC, and each logic functional entity in the PCC architecture as shown in FIG. 1 and the interface functions thereof are described below. As shown in FIG. 1, Application Function (AF) is used to provide an access point for the service applications, and the network resources used by these service applications require a dynamic policy control. When performing a parameter negotiation on a service panel, AF transmits related service information to a Policy and Charging Rules Function (PCRF) entity. If the service information accords with the policy of the PCRF, the PCRF accepts the negotiation; otherwise, the PCRF refuses the negotiation and gives service parameters that are acceptable by the PCRF in the feedback. Then, the AF may return these parameters to a User Equipment (UE). Wherein the interface between the AF and the PCRF is a Rx interface.

PCRF, which is the core of PCC, is responsible for making policy and charging rule. The PCRF provides network control rules based on service data flows, these network controls include: the detection of the service data flow, Gating Control, Quality of Service (QoS) control and charging rules based on data flows. The PCRF transmits the made policy and charging rules to a Policy and Control Enforcement Function (PCEF) entity to be implemented; meanwhile, the PCRF is also required to guarantee that theses rules are in accordance with the subscription information of the user. Wherein the policy and charging rules made by the PCRF comprise: service-related information obtained from the AF; user policy and charging control subscription information related to the policy control and charging obtained from a Subscription Profile Repository (SPR); information related to a bearer network obtained from the PCEF via a Gx interface.

The PCEF generally locates within a Gateway (GW), and implements the policy and charging rules made by the PCRF on a bearing panel. The PCEF detects service data flows according to a service data flow filter contained in the rule transmitted from the PCRF, so as to perform the policy and charging rules made by the RCRF on the service data flows; when establishing a bearer, the PCEF allocates resources according to the rules transmitted by the PCRF, and performs gating control according to information provided by the AF; meanwhile, the PCEF triggers reporting of an event occurred on the bearer network according to the events subscribed by the PCRF; according to the charging rules transmitted from the PCRF, PCEF performs charging operation for corresponding service data flows, wherein the charging may be online or offline. In the case of an online charging, it is necessary that the PCEF performs a credit management together with an Online Charging System (OCS); and in the case of an offline charging, the PCEF exchanges related charging information with an Offline Charging System (OFCS). Wherein the interface between the PCEF and the PCRF is a Gx interface, and the interface between the PCEF and the OCS is a Gy interface, and the interface between the PCEF and the OFCS is a Gz interface. The PCEF generally locates on the gateway of a network, for example, Packet Data Network-Gate Way (PDN-GW) of EPS, Gateway GPRS Support Node (GGSN) of General Packet Radio Service (GPRS) and Packet Data Gateway (PDG) of Interworking WLAN (I-WLAN).

Bearer Binding and Event Reporting Function (BBERF) entity generally locates within an access network gateway. For instance, if a user equipment accesses an EPS via an E-UTRAN and Proxy Mobile Internet Protocol version 6 (PMIPv6) is employed between the S-GW and the P-GW, then the BBERF exists in the S-GW. If a user equipment accesses via a creditable non-3GPP access network, then the BBERF also exists in the creditable non-3GPP access gateway.

The Subscription Profile Repository (SPR) stores user policy charging control subscription information related to the policy control and charging. The interface between the SPR and the PCRF is a Sp interface.

The OCS and the PCEF jointly complete the control and management of the user credit in the case of online charging.

The OFCS and the PCEF jointly complete the charging operation in the case of offline charging.

In the prior art, PCC supports dynamic usage monitoring control for performing a dynamic policy decision based on a total amount of the network resource usage in real-time. Usage monitoring can be applied to a single service data flow, a group of service data flows or all of the service flows of an IP-Connectivity Access Network (IP-CAN) session. Presently, usage refers to the data service of user panel. In the prior art, an instance required to be usage monitored is identified by a Monitoring Key, for example: if the PCRF allocates a Monitoring Key and corresponding threshold for all of the service flows of an IP-CAN session, then the PCEF monitors the traffic of all the service flows of the IP-CAN according to the threshold and identifies a reported usage with the Monitoring Key. If the PCRF allocates a monitoring key and corresponding threshold for one service data flow or a group of service flows, then the PCEF carries the Monitoring Key in a PCC rule corresponding to the service data flow or the group of service data flows, and monitors the traffic of the service data flows corresponding to the PCC rules having the same Monitoring Key, and identifies a reported usage with the Monitoring Key.

Meanwhile, a total allowanced usage of a certain PDN of a user may also be stored in an SPR, i.e. a total allowanced usage for all of the service flows of one IP-CAN session, which may also be referred to as a total allowanced usage per PDN per user. SPR may also stores a total allowanced usage for certain specific services of a PDN of a user, i.e. the total allowanced usage for one service data flow or a group of service data flows, which can also be identified with the Monitoring Key.

After the user establishes an IP-CAN session to a certain PDN, the SPR distributes the total allowanced usage to the PCRF. When PCRF performs a usage monitoring control, the PCRF subscribes a Usage_Report event trigger from the PCEF. After the Monitoring Key contained in the PCC rule is distributed, PCC rules having the same Monitoring Key share a threshold corresponding to the Monitoring Key. When the Monitoring Key is not contained in any PCC rule, all of the service data flows of the IP-CAN session share a threshold corresponding to the Monitoring Key. When it is monitored by PCEF that the usage reaches a threshold, an IP-CAN session terminates, all of the PCC rules containing a certain Monitoring Key are deleted or the PCRF explicitly requests a usage report, PCEF will reports the usage consumption of a related monitoring key since the last report to the PCRF. After the PCRF receives the usage report from the PCEF, the PCRF deducts the reported usage from the total allowanced usage. If the PCEF reports the usage of a certain monitoring key and a further monitoring is required, the PCRF will allocate a new threshold to the PCEF; and if no further monitoring is required, the PCRF will not allocates a new threshold to the PCEF. After the last IP-CAN session of an APN of the user terminates, the PCRF stores, in the SPR, the remaining allowanced usage comprising the total allowanced usage of the PDN or the total allowanced usage of some specific services of the PDN.

It can be seen from existing usage monitoring control scheme that existing usage monitoring control is performed for a certain PDN of a user or certain specific service flows of a certain PDN. Having some limitations, existing usage monitoring control cannot be applied in some cases, for example: for a family package, multiple users participated in this family package share a a total allowanced usage of a certain PDN or a total subscription allowanced usage of certain specific service flows of a certain PDN. In this case, the PCRF should simultaneously perform a usage monitoring on multiple IP-CAN sessions to the same PDN established for multiple users participated in this family package or certain specific service flows to the same PDN.

In the prior art, when multiple users share a total allowanced usage, there is provided no solution that a PCRF simultaneously performs usage monitoring on multiple users according to a total allowanced usage. If still using existing usage monitoring control method for implementing a monitoring control on the user equipments sharing the same subscription information, then it will definitely lead to conflicts in policy and charging controls.

SUMMARY

In view of the above, the main purpose of the present disclosure is to provide a method for implementing usage monitoring control, which is capable of implementing usage monitoring control for multiple user equipments sharing the same subscription information, and thereby avoiding conflicts in policy and charging controls.

Another purpose of the present disclosure is to provide a system for implementing a monitoring control, which is capable of implementing usage monitoring control for multiple user equipments sharing the same subscription information, and thereby avoiding conflicts in policy and charging controls.

In order to achieve the above purposes, the technical solutions of the present disclosure are implemented as follows:

the present disclosure provides a method for implementing usage monitoring control, including:

a PCRF makes a usage monitoring policy for each IP-CAN session or service data flow that shares a total allowanced usage according to the obtained total allowanced usage shared by multiple users;

a PCEF performs a usage monitoring according to the usage monitoring policy sent by the PCRF, and reports a usage to the PCRF;

the PCRF deducts a consumed usage from the total allowanced usage shared by the multiple users after the PCRF receives the usage reported by the PCEF.

In the above solution, the usage monitoring policy may include a usage threshold allocated by the PCRF for each IP-CAN session or service data flow that shares the total allowanced usage.

In the above solution, when a first user in the multiple users requests to establish an IP-CAN session, the step of obtaining, by the PCRF, the total allowanced usage shared by the multiple users may include:

the PCRF obtains the total allowance usage shared by the multiple users from a Subscription Profile Repository (SPR), and the total allowanced usage is comprised in a user subscription information returned by the SPR; and the SPR returns a user ID list of the users shares the total allowanced usage to the PCRF.

In the above solution, the step of making, by the PCRF, the usage monitoring policy for each IP-CAN session or service data flow that shares the total allowanced usage according to the obtained total allowanced usage shared by the multiple users may be: the PCRF allocates a first usage threshold to the first user of the multiple users according to the obtained total allowanced usage shared by the multiple users, wherein the first usage threshold is less than or equal to the total allowanced usage.

In the above solution, when a second user in addition to the first user in the multiple users requests to establish an IP-CAN session, the step of making, by the PCRF, a usage monitoring policy for each IP-CAN session or service data flow that shares a total allowanced usage according to the obtained total allowanced usage shared by multiple users may be:

the PCRF determines that the IP-CAN session established for the first user and the IP-CAN session established for the second user share the total allowanced usage according to the user ID list;

the PCRF allocates a second usage threshold for the second user according to the total allowanced usage, and a sum of the first usage threshold and the second usage threshold is less than or equal to the total allowanced usage.

In the above solution, the first usage threshold or the second usage threshold is for all service data flows of any one of the IP-CAN sessions, or for one or more service data flows of any one of the IP-CAN sessions.

In the above solution, when the first usage threshold or the second usage threshold is for all service data flows of any one of the IP-CAN sessions, the PCRF does not comprise the Monitoring Key in the Policy and Charging Control (PCC) rules;

when the first usage threshold or the second usage threshold is for one or more service data flows of any one of the IP-CAN sessions, but not for all of the service data flows, the PCRF includes the Monitoring Key in the PCC rules corresponding to the service data flows and then sends out, and PCC rules with the same Monitoring Key share the usage threshold of the Monitoring Key.

In the above solution, triggering conditions for the PCEF to report the usage to the PCRF may be: when an event requiring a usage report is triggered; or, when all PCC rules corresponding to the Monitoring Key are deleted or deactivated; or, when the IP-CAN session is terminated; or, when the PCRF requests the PCEF to report.

In the above solution, the method further includes: when all IP-CAN sessions of all users that share the total allowanced usage are terminated, the PCRF stores the remaining total allowanced usage in the SPR.

The present disclosure provides a system for implementing usage monitoring control, which comprises at least a PCRF and a PCEF, wherein, the PCRF is configured to make a usage monitoring policy for each IP-CAN session or service data flow that shares a total allowanced usage according to the obtained total allowanced usage shared by multiple users; send the usage monitoring policy to the PCEF, receive a usage reported by the PCEF, and deduct a consumed usage from the total allowanced usage;

the PCEF is configured to perform a usage monitoring according to the usage monitoring policy sent by the PCRF, and report the usage to the PCRF.

In the above solution, the system further includes an SPR which is configured to store the total allowanced usage shared by the multiple users and user IDs of the users that share the total allowanced usage.

In the above solution, the PCRF is further configured to store the remaining total allowanced usage in the SPR when all IP-CAN sessions of all users that share the total allowanced usage are terminated.

From the technical solutions provided by the present disclosure, the method comprises: a PCRF makes a usage monitoring policy for each IP-CAN session or service data flow that shares a total allowanced usage according to the obtained total allowanced usage shared by multiple users; a PCEF performs a usage monitoring according to the usage monitoring policy sent by the PCRF, and reports a usage to the PCRF; after the PCRF receives the usage, the PCRF deducts a consumed usage from the total allowanced usage shared by the multiple users. In the method of the present disclosure, when multiple users share a total allowanced usage, PCRF simultaneously monitors the usage on the multiple users according to the total allowanced usage, thereby avoiding conflicts in policy and charging controls.

BRIEF DESCRIPTION OF THE DRAWINGS

FIG. 5 is a flow chart of a second embodiment for implementing the usage report of FIG. 3;

FIG. 6 is a flow chart of a third embodiment for implementing the usage report of FIG. 3.

DETAILED DESCRIPTION

Figure 1:
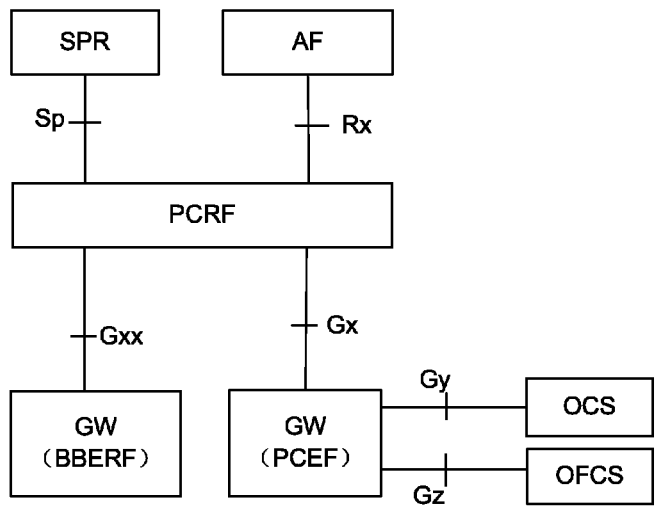
FIG. 1 is a schematic diagram of the architecture of existing PCC.
Figure 2:
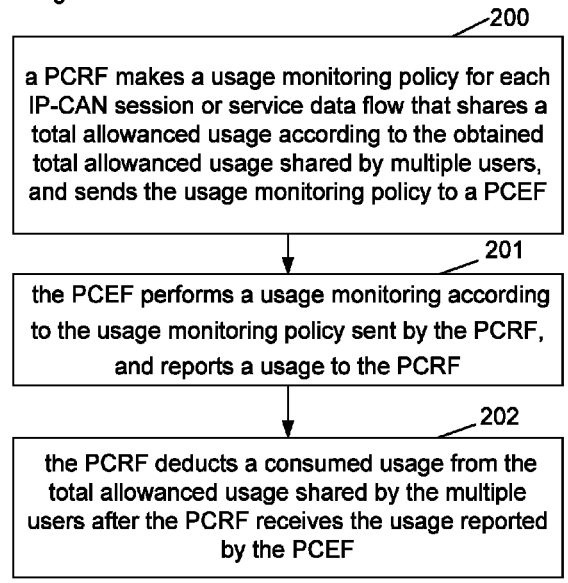
FIG. 2 is a flow chart of a method for implementing a usage monitoring control according to the present disclosure.

FIG. 2 is a flow chart of a method for implementing a usage monitoring control according to the present disclosure, as shown in FIG. 2, the method comprises:

S200: PCRF makes a usage monitoring policy for each IP-CAN session or service data flow that shares a total allowanced usage according to the obtained total allowanced usage shared by multiple users, and sends the usage monitoring policy to a PCEF;

herein, the usage monitoring policy comprises a usage threshold allocated by the PCRF for each IP-CAN session or service data flow that shares the total allowanced usage;

in this step, the PCRF obtains the total allowanced usage shared by multiple users from the SPR, and the total allowanced usage is contained in the user subscription information returned by the SPR; and simultaneously, the SPR also returns a ID list of users sharing the total allowanced usage to the PCRF;

the PCRF makes a usage monitoring policy according to the returned subscription information, wherein the usage monitoring policy comprises event triggers such as Usage_Report event and usage monitoring policy for a certain IP-CAN session or some specific service data flows, and the PCRF allocates a usage threshold according to the obtained total allowanced usage, wherein the usage threshold is equal to or less than the total allowanced usage. Wherein the usage threshold may be for all service data flows of a certain IP-CAN session, or may be for one or more service data flows of a certain IP-CAN session. If the PCRF monitors all service data flows of a certain IP-CAN session, the PCRF does not contain the Monitoring Key in the PCC rules; if the PCRF monitors some service data flows of a certain IP-CAN session, the PCRF comprises the Monitoring Key in the PCC rules corresponding to the service data flows and sends out, the PCC rules with the same Monitoring Key share the usage threshold of the Monitoring Key.

S201: PCEF performs usage monitoring according to the usage monitoring policy sent by the PCRF, and reports the usage to the PCRF.

In this step, the report of the usage by PCEF may occur when an event requiring a usage report is triggered, for example, the usage monitored by a certain Monitoring Key (including IP-CAN session level and service data flow level) reaches a threshold, or the like; it also may be triggered by terminating the IP-CAN session; and it also may be triggered when the PCRF requests the PCEF to report, or the like.

S202: After PCRF receives the usage reported by the PCEF, the PCRF deducts the consumed usage from the total allowanced usage shared by multiple users.

The method further comprises: storing the remaining total allowanced usage in the SPR when all IP-CAN sessions of all users that share the total allowanced usage terminate.

For the method of the present disclosure, there is provided a system for implementing usage monitoring control, which comprising at least a PCRF and a PCEF, wherein, the PCRF is configured to make a usage monitoring policy for each IP-CAN session or service data flow that shares a total allowanced usage according to the obtained total allowanced usage shared by multiple users; send the usage monitoring policy to the PCEF, receive usage reported by the PCEF, and deduct the consumed usage from the total allowanced usage shared by multiple users;

the PCEF is configured to perform the usage monitoring according to the usage monitoring policy sent by the PCRF, and report the usage to the PCRF.

The system of the present disclosure further comprises an SPR, and the SPR is configured to provide the total allowanced usage shared by multiple users and IDs of the users that share the total allowanced usage.

The PCRF is further configured to store the remaining total allowanced usage in the SPR when all IP-CAN sessions of all users that share the total allowanced usage are terminate.

The method of the in the present disclosure will be described below in details in conjunction with embodiments.

Figure 3:
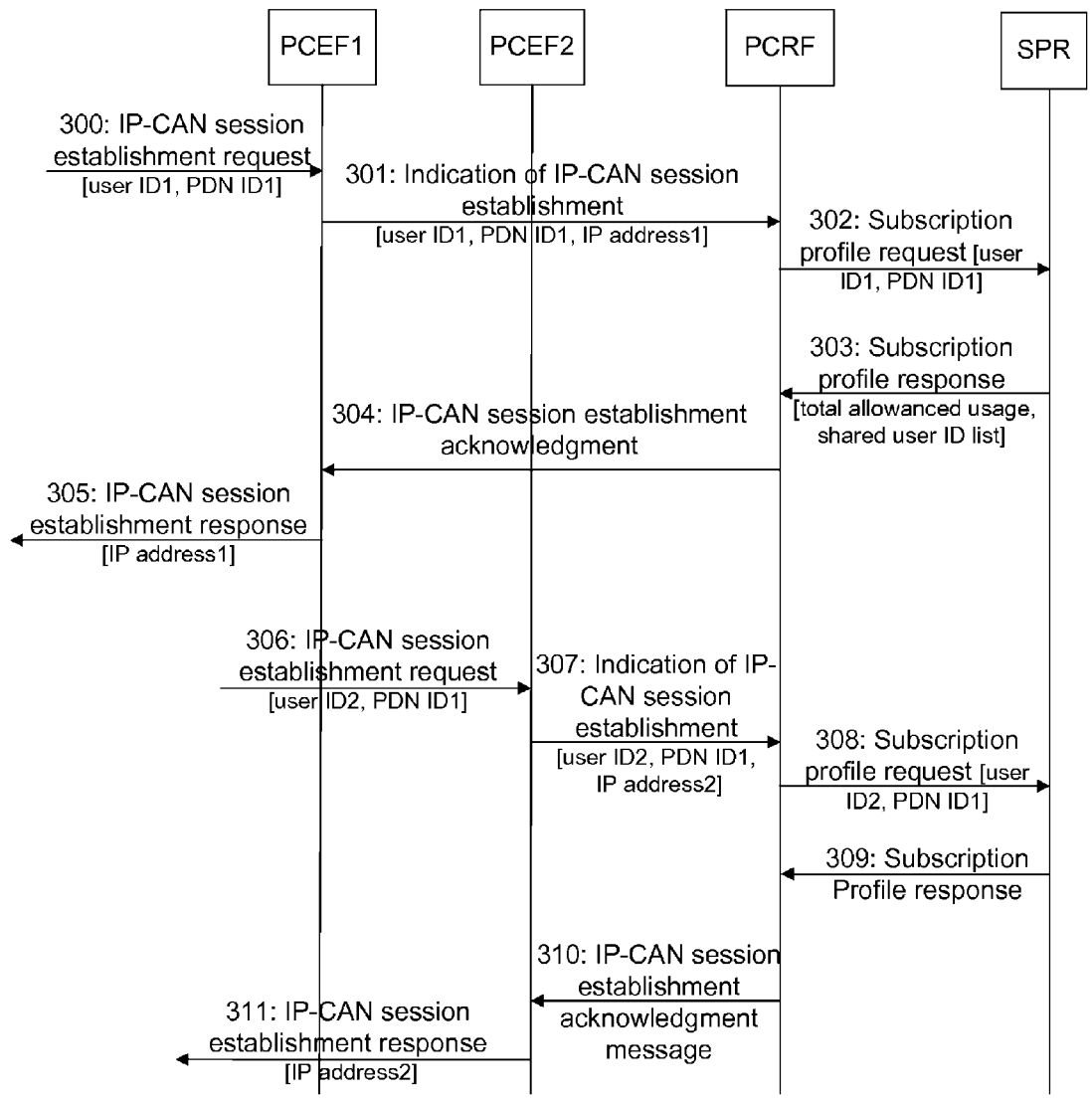
FIG. 3 is a flow chart of an embodiment of the method for implementing a usage monitoring control according to the present disclosure.

FIG. 3 is a flow chart of an embodiment of the method for implementing a usage monitoring control according to the present disclosure, the embodiment describes that a user equipment 1 (UE1) and a UE2 share the Total Allowanced Usage (TAU) of one PDN or the TAU of some specific service data flows of one PDN; after UE1 and UE2 establish an IP-CAN session, respectively, the PCRF performs usage monitoring control on the IP-CAN sessions established by UE1 and UE2 according to the TAU. As shown in FIG. 3, the method comprises:

S300: During the process that UE1 requests for the establishment of an IP-CAN session 1, UE1 sends an IP-CAN session establishment request message, in which the user ID1 of UE1 and the PDN ID1 of the PDN network requested to be accessed are carried, to the PCEF1.

S301: The PCEF1 sends an indication of IP-CAN session establishment message, in which the user ID1, the PDN ID1 and the IP address1 allocated to UE1 are carried, to the PCRF.

S302: The PCRF sends a subscription profile request, in which the user ID1 and the PDN ID1 are carried, to the SPR.

S303: The SPR carries the subscription information of UE1 in the returned subscription profile response according to the user ID1 and the PDN ID1;

in this step, since UE1 and UE2 share the total allowanced usage for the PDN ID1 or the total allowanced usage for some specific service flows of the PDN ID1, the SPR comprises the total allowanced usage in the subscription information, and carries it in the subscription profile response and returns to the PCRF, and simultaneously, carries the ID list of the users (i.e. the user ID1 and the user ID2) sharing the total allowanced usage in the subscription profile response and returns back.

S304: The PCRF makes a usage monitoring policy according to the returned subscription information containing the total allowanced usage, and carries the usage monitoring policy in an IP-CAN session establishment acknowledgment message returned to the PCEF1;

wherein the usage monitoring policy comprises event triggers such as Usage_Report event, usage monitoring policy for the IP-CAN session 1 or some specific service data flows. The PCRF allocates a usage threshold UT1 of UE1 according to the obtained total allowanced usage, and UT1≤TAU.

herein, UT1 may be for all service data flows of the IP-CAN session 1, and may be for one or more service data flows of the IP-CAN session 1. If the PCRF monitors all service data flows of the IP-CAN session 1, the PCRF does not comprise the Monitoring Key in the PCC rules; if the PCRF monitors some service data flows of the IP-CAN session 1, the PCRF comprises the Monitoring Key in the PCC rules corresponding to the service data flows and sends out, PCC rules with the same Monitoring Key share the usage threshold of the Monitoring Key. The PCEF1 performs usage monitoring according to the usage monitoring policy sent by the PCRF.

S305: The PCEF1 returns an IP-CAN session establishment response, in which the IP address 1 is carried, to UE1.

After S300 to S305, the PCEF1 performs usage monitoring on the IP-CAN session 1 established by UE1 according to the usage monitoring policy sent by the PCRF.

S306: During the process that UE2 requests for the establishment of an IP-CAN session 2, UE2 sends an IP-CAN session establishment request message, in which the user ID2 of UE1 and the PDN ID1 of the PDN network requested to be accessed are carried, to the PCEF2.

herein, the PCEF1 and the PCEF2 may be the same or different. In this embodiment, it is assumed that PCEF1 and PCEF2 are different.

S307: The PCEF2 sends an indication of IP-CAN session establishment message, in which the user ID2, the PDN ID1 and the IP address2 allocated for UE2 are carried, to the PCRF.

S308: The PCRF sends a subscription profile request, in which the user ID2 and the PDN ID1 are carried, to the SPR.

S309: The SPR carries the subscription information of UE2 in the returned subscription profile response according to the user ID2 and the PDN ID1;

in this step, since in S303, the SPR has already sent the total allowanced usage shared by UE1 and UE2 and the ID list of the users that share the total allowanced usage, and thus in this step, the SPR may not return the subscription information.

S310: The PCRF makes a usage monitoring policy according to the subscription information of UE2, and carries the usage monitoring policy in an IP-CAN session establishment acknowledgment message returned to the PCEF2;

wherein the usage monitoring policy comprises event triggers such as Usage_Report. The PCRF determines that the IP-CAN session 1 established by UE1 and the IP-CAN session 2 established by UE2 share the total allowanced usage according to the user ID list. The PCRF allocates the usage threshold UT2 of UE2 according to the TAU, and UT2+UT1≤TAU.

Here, the UT2 may be for all service data flows of the IP-CAN session 2, and may be for one or more service data flows of the IP-CAN session 2. If the PCRF monitors all service data flows of the IP-CAN session 2, the PCRF does not comprise the Monitoring Key in the PCC rules; if the PCRF monitors some service data flows of the IP-CAN session 2, the PCRF comprises the Monitoring Key in the PCC rules corresponding to the service data flows and sends out, the PCC rules with the same Monitoring Key share the usage threshold of the Monitoring Key. The PCEF2 performs usage monitoring according to the usage monitoring policy sent by the PCRF.

S311: The PCEF2 returns an IP-CAN session establishment response, in which the IP address 2 is carried, to UE2.

So far, UE2 establishes IP-CAN session 2, the PCRF obtains the total allowanced usage from the SPR and sends the usage monitoring policy, respectively, to the PCEF1 and the PCEF2, in which the usage thresholds UT1 and UT2 are comprised. The PCEF1 and the PCEF2 perform usage monitoring.

Figure 4:
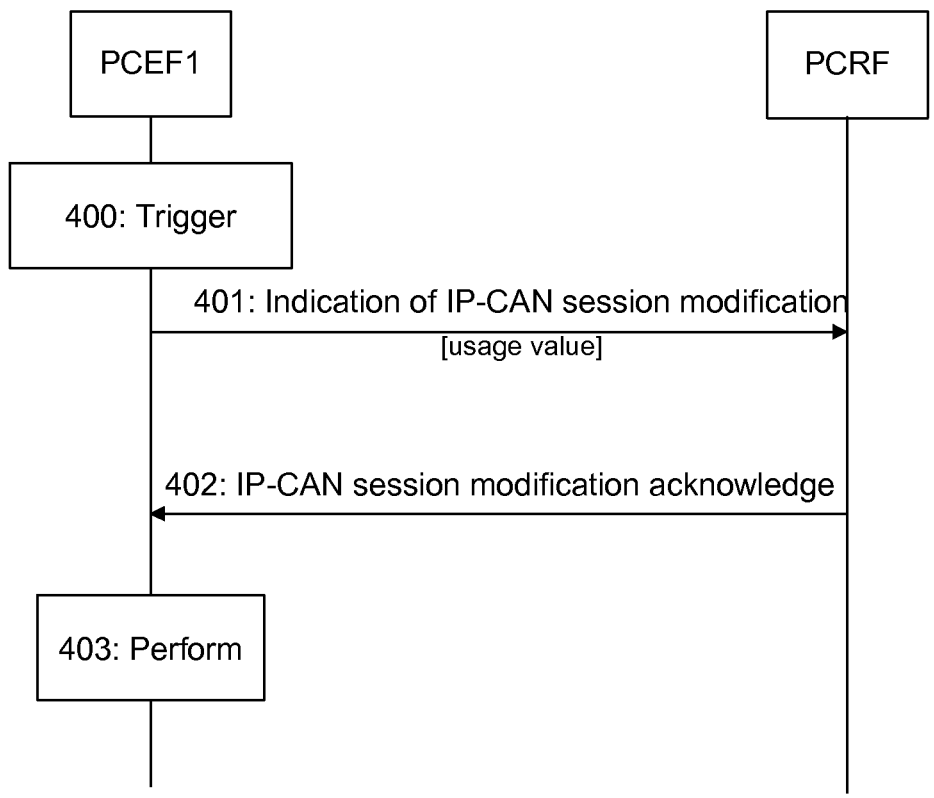
FIG. 4 is a flow chart of a first embodiment for implementing the usage report of FIG. 3.

FIG. 4 is a flow chart of a first embodiment for implementing the usage report of FIG. 3. As shown in FIG. 4, the flow chart comprises:

S400: The PCEF1 detects that an event requiring a usage report is triggered, the triggering may be the usage monitored by a certain Monitoring Key (including IP-CAN session level and service data flow level) reaches a threshold or all PCC rules corresponding to a certain Monitoring Key are deleted or deactivated.

S401: The PCEF1 sends an indication of IP-CAN session modification message, in which the event trigger value including Usage_Report and the Usage Report Value1 (URV1) are carried, to the PCRF. If the triggering condition is that the usage monitored by a certain Monitoring Key reaches a threshold, then URV1=UT1; if the triggering condition is that all PCC rules corresponding to a certain Monitoring Key are deleted or deactivated, then URV1≤UT1.

S402: The PCRF deducts the Usage Report Value1 URV1 from the total allowanced usage, i.e. updating the TAU with the value of (TAU−URV1). If the PCRF determines it is necessary to continue usage monitoring, and TAU−UT2>0, the PCRF will allocate a new usage threshold UT1', and the UT1'≤TAU−UT2;

the PCRF returns an IP-CAN session modification acknowledgement message to the PCEF1. If the PCRF allocates a new usage threshold UT1', the UT1' is carried in the IP-CAN session modification acknowledgement message.

S403: If the PCRF sends out a new usage threshold UT1', the PCEF1 will continue to perform usage monitoring; if the PCRF does not send out a new usage threshold, the PCEF1 will not perform usage monitoring any more.

FIG. 5 is a flow chart of a second embodiment for implementing the usage report of FIG. 3. As shown in FIG. 5, the flow chart comprises:

S500: The PCEF1 detects that the requirement of terminating the IP-CAN session1 is triggered, the triggering may be from other network elements, UE1 or PCEF1 itself.

S501: The PCEF1 sends an indication of IP-CAN session termination message, in which the usage value of each Monitoring Key for performing usage monitoring is carried, to the PCRF, the usage value is URV1 in the embodiment as shown in FIG. 3. Here, URV1≤UT1.

S502: The PCRF deducts the Usage Report Value URV1 from the total allowanced usage, i.e. updating the total allowanced usage with the value of (TAU−URV1). The PCRF returns an IP-CAN session termination acknowledgement message to the PCEF1. As the IP-CAN session2 of UE2 is now still using the total allowanced usage, the PCRF will not report the TAU currently remains to the SPR.

S503: The PCEF2 detects that the requirement of terminating the IP-CAN session2 is triggered, the triggering may be from other network elements, UE2 or PCEF2 itself.

S504: The PCEF2 sends an indication of IP-CAN session termination message, in which the usage value of each Monitoring Key for performing usage monitoring is carried, to the PCRF, the usage value is URV2 in the embodiment as shown in FIG. 3. Here, URV2≤UT2.

S505: The PCRF deducts the Usage Report Value URV2 from the total allowanced usage, i.e. updating the TAU with the value of (TAU−URV2). The PCRF returns an IP-CAN session termination acknowledgement message to the PCEF2.

S506: The PCRF learns that all IP-CAN sessions (i.e. IP-CAN session 1 and IP-CAN session 2) of all users (i.e. UE1 and UE2) that share the total allowanced usage are terminated, the PCRF sends a cancel subscription notification request message, in which the remaining total allowanced usage is carried, to the SPR.

S507: The SPR returns a cancel subscription notification response message to the PCRF.

FIG. 6 is a flow chart of a third embodiment for implementing the usage report of FIG. 3. As shown in FIG. 6, the flow chart comprises:

S600: The PCRF detects that an event that requires the PCEF1 to report usage is triggered.

S601: The PCRF sends a usage report request message to the PCEF1 to request the PCEF1 to report the usage, the Monitoring Key to be reported is carried in the usage report request message, the Monitoring Key is sent out by PCRF previously, and the Monitoring Key may be for all service data flows of the IP-CAN session 1, and also may be for one service data flow or a group of service data flows of the IP-CAN session 1.

S602: The PCEF1 sends a usage report response message, in which the Usage Report Value URV1 of the Monitoring Key to be reported is carried, to the PCRF. Here, URV1≤UT1.

S603: The PCRF deducts the reported Usage Report Value URV1 from the total allowanced usage of the Monitoring Key requested to be reported, i.e. updating the total allowanced usage with the value of (TAU−URV1).

In the embodiments as described in FIG. 3-6, UE1 and UE2 share the total allowanced usage, and UE1 and UE2 only establish one IP-CAN session for one APN (i.e. PDN ID1), respectively. The method of the present disclosure is also applicable to the case in which UE1 and UE2 establish multiple IP-CAN sessions for one APN (i.e. PDN ID1), respectively, the specific implementations in accordance with the method of the present disclosure can be easily obtained by persons skilled in the art according to the foregoing embodiments and will not be described herein. It may be implemented as long as the PCRF obtains the shared total allowanced usage and the sharing user ID list, and allocates the usage by taking all IP-CAN sessions of one user for the same APN as a whole. Only when the PCRF determines that all IP-CAN sessions of all users that share the total allowanced usage are terminated, the PCRF stores the remaining total allowanced usage in the SPR.

In other implementations, the storing the shared subscription information (including the total allowanced usage shared by multiple users and the user ID list of the total allowanced usage) may be implemented by a User Data Convergence (UDC) architecture, and the SPR serves as the front-end of the UDC architecture. Of course, the shared subscription information also may be stored in other databases, not limited to the SPR.

Although the above embodiments describe the implementation flows for usage monitoring control in the case where two users share a subscribed total allowanced usage, the flows for usage monitoring control in the case where more than two users share a subscribed total allowanced usage are similar.

The above embodiments are only preferred embodiments of the present disclosure, and not intend to limit the protection scope of the present disclosure, any modification, equivalent replacement and improvement within the principle of the present disclosure should be included in the protection scope of the present disclosure.

The invention claimed is:

1. A method for implementing usage monitoring control, comprising:
    making, by a Policy and Charging Rules Function (PCRF), a usage monitoring policy for each IP Connectivity Access Network (IP-CAN) session or service data flow that shares a total allowanced usage according to the total allowanced usage shared by multiple users;
    performing, by a Policy and Charging Enforcement Function (PCEF), a usage monitoring according to the usage monitoring policy sent by the PCRF, and reporting, by the PCEF, a usage to the PCRF;
    deducting, by the PCRF, a consumed usage from the total allowanced usage shared by the multiple users after the PCRF receives the usage reported by the PCEF;
    wherein the total allowanced usage shared by multiple users is obtained by the PCRF from a Subscription Profile Repository (SPR), the total allowanced usage shared by multiple users is comprised in a user subscription information returned by the SPR and a user ID list of the users sharing the total allowanced usage is returned to the PCRF by the SPR.

2. The method according to claim 1, wherein the usage monitoring policy comprises a usage threshold allocated by the PCRF for each IP-CAN session or service data flow that shares the total allowanced usage.

3. The method according to claim 2, further comprising: when all IP-CAN sessions of all users that share the total allowanced usage are terminated, storing, by the PCRF, a remaining total allowanced usage in the SPR.

4. The method according to claim 1, wherein when a first user in the multiple users requests to establish an IP-CAN session, obtaining, by the PCRF, the total allowanced usage shared by the multiple users from the SPR, and the total allowanced usage is comprised in the user subscription information returned by the SPR; and the SPR returns the user ID list of the users sharing the total allowanced usage to the PCRF.

5. The method according to claim 4, wherein the step of making, by the PCRF, the usage monitoring policy for each IP-CAN session or service data flow that shares the total allowanced usage according to the total allowanced usage shared by the multiple users is: allocating, by the PCRF, a first usage threshold for the first user of the multiple users according to the obtained total allowanced usage shared by the multiple users, wherein the first usage threshold is less than or equal to the total allowanced usage.

6. The method according to claim 5, wherein when a second user in addition to the first user in the multiple users requests to establish an IP-CAN session, the step of making, by the PCRF, a usage monitoring policy for each IP-CAN session or service data flow that shares the total allowanced usage according to the total allowanced usage shared by the multiple users is:
 determining, by the PCRF, that the IP-CAN session established for the first user and the IP-CAN session established for the second user share the total allowanced usage according to the user ID list;
 allocating, by the PCRF, a second usage threshold for the second user according to the total allowanced usage, and a sum of the first usage threshold and the second usage threshold is less than or equal to the total allowanced usage.

7. The method according to claim 6, wherein the first usage threshold or the second usage threshold is for all service data flows of any one of the IP-CAN sessions, or for one or more service data flows of any one of the IP-CAN sessions.

8. The method according to claim 7, wherein when the first usage threshold or the second usage threshold is for all service data flows of any one of the IP-CAN sessions, the PCRF does not make a Monitoring Key comprised in Policy and Charging Control (PCC) rules;
 when the first usage threshold or the second usage threshold is for one or more service data flows of any one of the IP-CAN sessions, but not for all of the service data flows, the PCRF makes the Monitoring Key comprised in the PCC rules corresponding to the service data flows and then provides, and PCC rules with the same Monitoring Key share the usage threshold of the Monitoring Key.

9. The method according to claim 5, wherein the first usage threshold or the second usage threshold is for all service data flows of any one of the IP-CAN sessions, or for one or more service data flows of any one of the IP-CAN sessions.

10. The method according to claim 1, further comprising: when all IP-CAN sessions of all users that share the total allowanced usage are terminated, storing, by the PCRF, a remaining total allowanced usage in the SPR.

11. The method according to claim 2, wherein when a first user in the multiple users requests to establish an IP-CAN session, obtaining, by the PCRF, the total allowanced usage shared by the multiple users from the SPR, and the total allowanced usage is comprised in the user subscription information returned by the SPR; and the SPR returns the user ID list of the users sharing the total allowanced usage to the PCRF.

12. The method according to claim 11, wherein the step of making, by the PCRF, the usage monitoring policy for each IP-CAN session or service data flow that shares the total allowanced usage according to the total allowanced usage shared by the multiple users is: allocating, by the PCRF, a first usage threshold for the first user of the multiple users according to the obtained total allowanced usage shared by the multiple users, wherein the first usage threshold is less than or equal to the total allowanced usage.

13. The method according to claim 12, wherein when a second user in addition to the first user in the plurality of users requests to establish an IP-CAN session, the step of making, by the PCRF, a usage monitoring policy for each IP-CAN session or service data flow that shares the total allowanced usage according to the total allowanced usage shared by the multiple users is:
 determining, by the PCRF, that the IP-CAN session established for the first user and the IP-CAN session established for the second user share the total allowanced usage according to the user ID list;
 allocating, by the PCRF, a second usage threshold for the second user according to the total allowanced usage, and a sum of the first usage threshold and the second usage threshold is less than or equal to the total allowanced usage.

14. The method according to claim 13, wherein the first usage threshold or the second usage threshold is for all service data flows in any one of the IP-CAN sessions, or for one or more service data flows in any one of the IP-CAN sessions.

15. The method according to claim 12, wherein the first usage threshold or the second usage threshold is for all service data flows of any one of the IP-CAN sessions, or for one or more service data flows of any one of the IP-CAN sessions.

16. The method according to claim 15, wherein when the first usage threshold or the second usage threshold is for all service data flows of any one of the IP-CAN sessions, the PCRF does not make a Monitoring Key comprised in Policy and Charging Control (PCC) rules;
 when the first usage threshold or the second usage threshold is for one or more service data flows of any one of the IP-CAN sessions, but not for all of the service data flows, the PCRF makes the Monitoring Key comprised in the PCC rules corresponding to the service data flows and then provides, and PCC rules with the same Monitoring Key share the usage threshold of the Monitoring Key.

17. A system for implementing usage monitoring control, at least comprising a PCRF, a PCEF and an SPR, wherein,
 the PCRF is configured to make a usage monitoring policy for each IP-CAN session or service data flow that shares a total allowanced usage according to the total allowanced usage shared by multiple users; send the usage monitoring policy to the PCEF, receive a usage reported by the PCEF, and deduct a consumed usage from the total allowanced usage;
 the PCEF is configured to perform a usage monitoring according to the usage monitoring policy sent by the PCRF, and report the usage to the PCRF;
 the SPR is configured to store the total allowanced usage shared by the multiple users and user IDs of the users that share the total allowanced usage;
 the PCRF is further configured to obtain the total allowanced usage shared by the multiple users and a user ID list of the users sharing the total allowanced usage from the SCR, wherein the total allowanced usage shared by multiple users is comprised in a user subscription information returned by the SPR.

18. The system according to claim 17, wherein the PCRF is further configured to store a remaining total allowanced usage in the SPR when all IP-CAN sessions of all users that share the total allowanced usage are terminated.

* * * * *